(12) United States Patent
Pasha et al.

(10) Patent No.: US 10,353,686 B1
(45) Date of Patent: Jul. 16, 2019

(54) APPLICATION INSTALLATION SYSTEM

(71) Applicant: Facebook, Inc., Menlo Park, CA (US)

(72) Inventors: Zain Pasha, Fremont, CA (US); John Stephen Ketchpaw, Seattle, WA (US); Tong Man, Bellevue, WA (US); Stephanie Shum, Sunnyvale, CA (US); Mina Maher Shawky Abouseif, Sammamish, WA (US); Robert Huang, Seattle, WA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/392,945

(22) Filed: Dec. 28, 2016

(51) Int. Cl.
H04L 29/08 (2006.01)
G06F 8/61 (2018.01)

(52) U.S. Cl.
CPC .............. G06F 8/61 (2013.01); H04L 67/34 (2013.01)

(58) Field of Classification Search
CPC .............. G06F 8/60; G06F 8/61; H04L 67/34
USPC ................................................ 717/168–178
See application file for complete search history.

(56) References Cited

U.S. PATENT DOCUMENTS

| 6,775,830 | B1* | 8/2004 | Matsunami | G06F 8/61 717/174 |
| 7,774,762 | B2* | 8/2010 | Rochette | G06F 8/61 717/138 |
| 8,024,815 | B2* | 9/2011 | Lorch | H04N 21/4435 726/29 |
| 8,074,231 | B2* | 12/2011 | Hunt | G06F 9/4411 719/321 |
| 8,156,488 | B2* | 4/2012 | Kotamarthi | G06F 21/6281 717/174 |
| 8,255,991 | B1* | 8/2012 | Hackborn | G06F 8/61 726/21 |

(Continued)

OTHER PUBLICATIONS

G. Chen, J. H. Cox A. S. Uluagac and J. A. Copeland, "In-Depth Survey of Digital Advertising Technologies," in IEEE Communications Surveys & Tutorials, vol. 18, No. 3, pp. 2124-2148, third quarter 2016. (Year: 2016).*

(Continued)

Primary Examiner — Andrew M. Lyons
(74) Attorney, Agent, or Firm — Baker Botts L.L.P.

(57) ABSTRACT

In one embodiment, a method includes presenting, in a user interface of a host application, content that includes a download link referencing a downloadable application, wherein the user interface of the host application performs operations unrelated to downloading applications, receiving, in the host application, selection of the download link, and downloading and installing the host application while the host application performs the operations unrelated to downloading applications. The downloading and installing comprises sending, to a server computer system, a request to download the downloadable application, receiving an application package that corresponds to the downloadable application, and installing the downloadable application on the computer system from the application package by executing program code having permission to install applications. The content may include an advertisement for the application, and the advertisement may include the download link. The download link may identify the server computer system and the application package.

20 Claims, 6 Drawing Sheets

(56) References Cited

U.S. PATENT DOCUMENTS

| | | | | |
|---|---|---|---|---|
| 8,332,936 B1* | 12/2012 | Hackborn | G06F 8/61 | 713/176 |
| 8,341,631 B2* | 12/2012 | Havemose | G06F 8/62 | 718/100 |
| 8,484,728 B2* | 7/2013 | De Atley | G06F 21/51 | 711/154 |
| 8,528,062 B1* | 9/2013 | Connor | H04L 63/14 | 713/187 |
| 8,640,187 B2* | 1/2014 | Walsh | G06F 21/10 | 726/1 |
| 8,868,692 B1* | 10/2014 | Khanna | H04L 41/0866 | 709/219 |
| 9,032,387 B1* | 5/2015 | Hill | G06F 8/61 | 717/173 |
| 9,183,259 B1* | 11/2015 | Marra | G06F 17/30867 | |
| 9,830,169 B2* | 11/2017 | Chakrabarti | G06F 9/445 | |
| 2006/0069692 A1* | 3/2006 | Pernia | G06F 21/53 | |
| 2007/0260749 A1* | 11/2007 | Lahdensivu | G06F 9/451 | 709/246 |
| 2009/0300596 A1* | 12/2009 | Tyhurst | G06F 8/65 | 717/173 |
| 2010/0077475 A1* | 3/2010 | Deschenes | G06F 8/61 | 726/21 |
| 2010/0078018 A1* | 4/2010 | Heinonen | A61M 16/01 | 128/202.22 |
| 2010/0313196 A1* | 12/2010 | De Atley | G06F 8/61 | 717/174 |
| 2011/0099516 A1* | 4/2011 | Hughes | G06F 8/61 | 715/810 |
| 2011/0173251 A1* | 7/2011 | Sandhu | G06F 8/61 | 709/203 |
| 2011/0265080 A1* | 10/2011 | Matthew | G06F 8/61 | 717/176 |
| 2011/0276396 A1* | 11/2011 | Rathod | G06F 17/30867 | 705/14.49 |
| 2012/0084292 A1* | 4/2012 | Liang | G06F 17/30899 | 707/741 |
| 2012/0209946 A1* | 8/2012 | McClure | H04N 21/233 | 709/217 |
| 2013/0159996 A1* | 6/2013 | Lin | G06F 8/60 | 717/178 |
| 2013/0263113 A1* | 10/2013 | Cavazza | G06F 8/63 | 717/178 |
| 2014/0052683 A1* | 2/2014 | Kirkham | G06Q 30/0631 | 706/46 |
| 2014/0359408 A1* | 12/2014 | Rosenberg | G06F 8/61 | 715/205 |
| 2015/0046934 A1* | 2/2015 | Schechter | G06F 9/542 | 719/318 |
| 2015/0073892 A1* | 3/2015 | Brown | G06Q 30/0246 | 705/14.45 |
| 2015/0095905 A1* | 4/2015 | Chakrabarti | G06F 9/445 | 717/178 |
| 2015/0249673 A1* | 9/2015 | Niemoeller | H04W 4/001 | 726/4 |
| 2015/0281238 A1* | 10/2015 | Ramachandran | G06F 21/51 | 726/4 |
| 2015/0347123 A1* | 12/2015 | Zhu | H04L 67/10 | 717/172 |
| 2015/0378709 A1* | 12/2015 | D'Amico | G06F 8/61 | 717/176 |
| 2016/0085521 A1* | 3/2016 | Savliwala | G06F 17/30867 | 717/108 |
| 2016/0085533 A1* | 3/2016 | Jayanti Venkata | G06F 8/60 | 717/175 |
| 2016/0085977 A1* | 3/2016 | Oh | G06F 8/61 | 726/20 |
| 2016/0092186 A1* | 3/2016 | Cross | G06F 8/61 | 717/177 |
| 2016/0188671 A1* | 6/2016 | Gupta | G06F 17/30528 | 707/722 |
| 2017/0078444 A1* | 3/2017 | Rajwat | H04L 67/34 | |
| 2017/0169343 A1* | 6/2017 | Kirkham | G06N 5/04 | |
| 2017/0206065 A1* | 7/2017 | Ben-Tzur | G06F 8/34 | |

OTHER PUBLICATIONS

B. Christophe, M. Narganes, V. Antila and L. Maknavicius, "Mobile execution environment for non-intermediated content distribution," in Bell Labs Technical Journal, vol. 15, No. 4, pp. 117-134, Mar. 2011. (Year: 2011).*

I. Ullah, R. Boreli, M. A. Kaafar and S. S. Kanhere, "Characterising user targeting for in-App Mobile Ads," 2014 IEEE Conference on Computer Communications Workshops (INFOCOM WKSHPS), Toronto, ON, 2014, pp. 547-552. (Year: 2014).*

* cited by examiner

APPLICATION INSTALLATION SYSTEM

TECHNICAL FIELD

This disclosure generally relates to installing applications on computing devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a direct application install feature may be used by third-party applications to download and install additional applications onto a mobile device. This direct install feature can be used to provide download links or buttons in third-party applications that may download and install applications in response to a single user action, such as touching the link or button. The direct install feature simplifies the user interface aspects of downloading and installing applications from third-party applications such as social-networking applications, web browsers, and the like. For example, an advertisement for an application on a web site or in another application many include a link that the user can select to download and install another application without leaving the application in which the advertisement was presented. In particular embodiments, the direct install feature may be used by an application that presents content, such as advertisements, to download and install other applications directly, e.g., without requiring the user to interact with another application such as an app store. That is, an application can be downloaded and installed when a user selects an advertisement, without requiring the user to leave the application that displays the advertisement. This direct application install feature can increase the number of users who download applications linked to by advertisements or other content, because users are more likely to download applications when the process is simple and non-intrusive.

The application to be downloaded may request permission to perform particular types of operations on the mobile device, such as accessing network or storage resources, in which case the user may be prompted to grant the requested permission in a dialog box or other user interface element. If the application to be downloaded does not request such permissions, or the user has previously granted the permissions, then the download and install may be performed in a single user interaction, e.g., with no further interactions by the user after the link has been selected. In particular embodiments, third-party applications such as those provided by third-party application developers are not permitted to download and install other applications, and such permission cannot be granted by the user. The direct install feature may, however, be implemented by delegating download requests from applications to particular computer program code that is authorized to download and install applications. The program code may have been authorized at the time of the device's manufacture, for example.

DESCRIPTION OF EXAMPLE EMBODIMENTS

Figure 1:
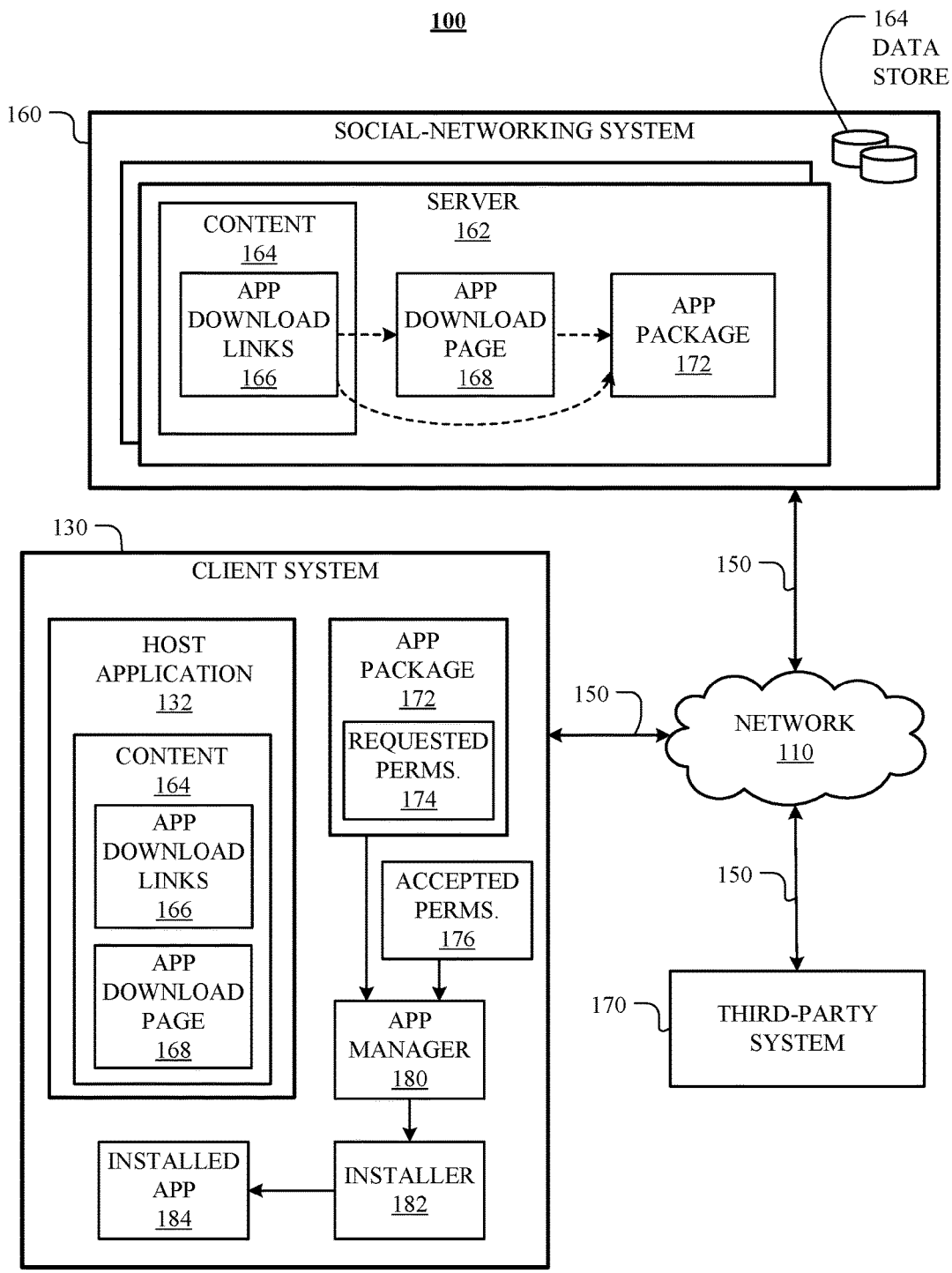
FIG. 1 illustrates an example network environment associated with application installation in a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, applications may be downloaded from one or more servers 162 onto a mobile system 130 and installed on the mobile system 130 for use. The downloadable applications may be, for example, photo sharing applications, games, messaging applications, and so on. One or more servers 162, which may include a web server, provide content 164, such as web pages or other types of documents that may contain text, graphics, and other forms of media to client system 130. The content 164 may include one or more application download links 166, which may be, e.g., hyperlinks that may include Uniform Resource Locator(s) ("URLs") identifying the network location (e.g., network host name or address, and path on the host) from which an application download page 168 and application package 172 may be downloaded by the client system 130. A downloadable application may be represented as an application package 172, e.g., an ANDROID application package ("APK") file, IPHONE application ("IPA") file, or the like. The application package 172 may alternatively be an executable file that contains computer program code that implements the downloadable application, or an archive file that contains the program code and one or more other files used by the downloadable application. The content 164 may be provided by a third-party system 170 or other data source. The third-party system 170 may be hosted by, for example, an app store operator, such as a vendor of the client device 130 or the client device's operating system. Alternatively, the third-party system 170 may be hosted by or on behalf of a developer of the application that is to be installed from the application package 172.

The servers 162 may include a web server that provides the content 164 via the network 150, e.g., as web pages or the like, and a download server that provides one or more application download pages 168 and application packages 172. The application download page 168 may reference a different server that hosts the application package 172 for an application described on the application download page 168. In one example, the application download page may automatically redirect a request for the download page 168 to the app package 172. The third-party system 170 may host the web server and/or the installation server. In another example, the application download page 168 may be hosted by the same server that hosts the content 164. In still another example, the content 164, application download page 168, and application package 172 may be hosted and by a single server 162. The application package 172 may be provided by the third-party system 170, e.g., by a software developer or app store operator.

In particular embodiments, the application package 172 may include one or more files containing machine-readable computer program code that implements an application. The application package 172 may also include configuration metadata, such as a list of permissions to be requested by the application when it is installed or executed. The downloadable application may be an application package 172, e.g., an ANDROID application package ("APK") file, IPHONE application ("IPA") file, or the like. Installing an application may be performed by copying the data in the application package 172 that represents the application's program code to the client system 130. The application package 172 may be encrypted and signed, e.g., using public-key encryption to prevent unauthorized modification. An encrypted application package may be decrypted using appropriate decryption keys at the time it is installed or at the time it is executed. The content 164, application download page 168, and application package 172 may be stored in and retrieved from the data store 164 by one or more servers 162.

In particular embodiments, the client system 130, which may be, for example, a user's mobile device or other type of computing device, executes a host application 132, such as a previously-installed social-networking application, web browser, third-party application, or other application executable by the client device 130. The host application 132 may request the content 164 from the server 162, e.g., via an HTTP GET request or the like. The content may be a web page or other type of document, and may include an advertisement for a downloadable application. The client system 130 may send the request to the server 162 and receive a response containing the content 164 via the network 150.

The host application 132 may present the content 164 to the user, e.g., on a display screen or other output device of the client system 130. The presented content 164 may include one or more application download link(s) 166 for the downloadable application(s). When the user selects one of the application download links 166, e.g., a link 166 to download a photo sharing application, the client system 130 may request the object referenced by the selected application download link 166, which may be, e.g., the application download page 168 or the application package 172 itself, as described below, or another suitable downloadable object that corresponds to the downloadable application associated with the selected link 166. The host application 132 or the download page 168 (e.g., a script or other condition on the page) may determine whether the download page 168 is presented to the user. If the download page 168 is presented, then contents of the download page 168, e.g., a description of the associated application, may be displayed. The download page 168 may be presented to the user to, for example, allow the user to view information about the downloadable application before deciding to initiate the download. The user may initiate the download by selecting a second download link on the download page 168 (e.g., a link that is separate from the application download link 166). Further, the user may leave the second download link unselected, in which case the download is not initiated.

The application download page 168 may include information about the downloadable application associated with the selected download link 166, e.g., a description of the photo sharing application. The information may include the name and developer of the application, screen shots of the application, a description of the application, pricing information, reviews, related applications, and a second link to download the application (e.g., a link that directly or indirectly references the application package 172). When the user selects the second link on the application download page 168, the client system 130 may request the application package 172 from the server 162.

In particular embodiments, if the host application 132 or the download page 168 determines that the download is to be initiated automatically, then the download page 168 is not presented to the user, and the download of the application may be initiated automatically, e.g., without user input. For example, the application 132 may automatically use the application download link 166 (or the second download link from the download page 168) to initiate the download, in which case the download page 168 may optionally be presented to the user. This automatic initiation of the download may simplify the process of downloading applications because the download may be initiated response to a single user action, e.g., the selection of the app download link 166 presented in the content 164, without the user selecting the second download link from the app download page 168.

In particular embodiments, when the download is initiated by a request sent from the client system 130 to the server 162, the server 162 may send the requested object, e.g., the download page 168 or the application package 172, back to the client system 130. The server 162 may send the application package 172 to the client system via the network 150. An App Manager 180 may control the download process by, for example, performing operations related to downloading and checking permissions. When the application package 172 has been received by the client system 130, the App Manager 180 may extract or retrieve a set of requested permissions 174 from the application package 172, and present a request to the user for asking for approval to perform operations corresponding to the requested permissions, e.g., opening files, accessing contact information, accessing a camera on the client device 130, and so on. The user's response may be received by the operating system. Alternatively, the App Manager 180 may pass the requested permissions 174 to the operating system, and the operating system may present the request to the user and receive the user's response. As another alternative, the permissions may be requested at different times, e.g., when the operations that correspond to the permissions are invoked.

In particular embodiments, when the requested permissions 174 have been requested, and a response specifying a set of accepted permissions 176 has been received from the user, the set of accepted permissions 176 may be compared to the set of requested permissions 174. If the sets are the same, then the installation process may continue, and the App Manager 180 may invoke an installer 182 to install the application package 172. The installer 182 may install the application package 172 on the client system, thereby making the downloaded application available for use as an installed application 184. Alternatively, if the set of accepted permissions partially matches the set of requested permissions, then a determination may be made as to whether to install the application package 172. For example, if the application package indicates that some of the permissions are optional, and that the application can continue without them, possibly with reduced functionality, then the application manager ("App Manager") 180 may invoke the installer 182 to install the application package 172. As another alternative, if the set of accepted permissions does not match the set of requested permissions 174, then the installation may be halted without installing the application package 172, since the user has not granted the permissions that the application package 172 indicates it requires.

Figure 2:
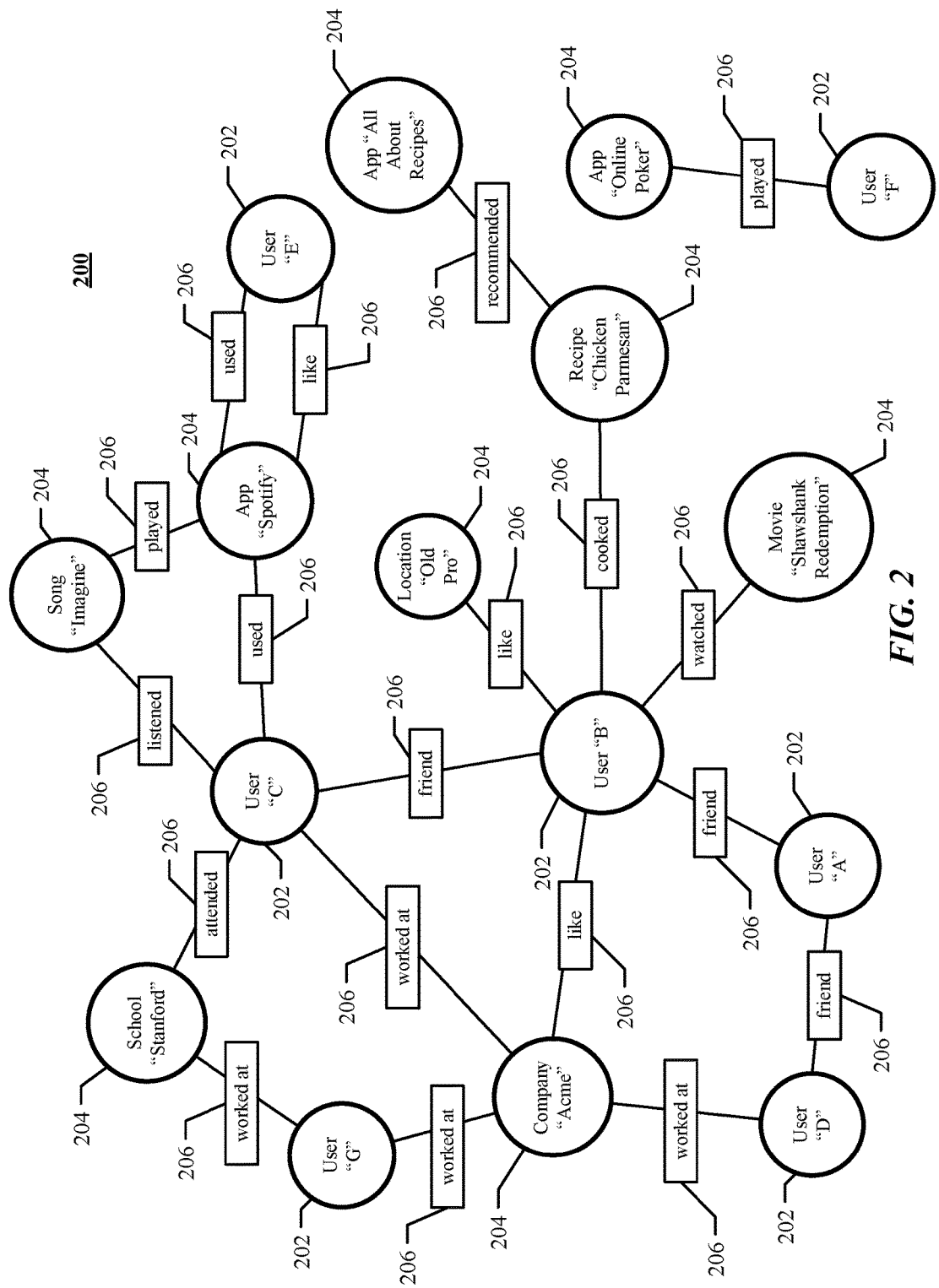
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Application developers may distribute applications for mobile devices through application ("app") purchasing and downloading services that are referred to as "app stores" and provided as part of the devices' operating systems. Example app stores include the GOOGLE PLAY STORE for ANDROID devices and the APPLE APP STORE for IPHONE devices. Publicizing and promoting applications in app stores can be difficult, however. Popular applications are ordinarily highlighted in prominent positions in the app store, such as in lists of the most-downloaded or best-selling applications, but numerous less-popular applications are not as easily discovered by users. To address this problem, application developers can use advertising to publicize and promote their applications outside the app store, e.g., by displaying advertisements in applications other than the app store application, such as in a social networking application or on popular web sites that are relevant to the applications being promoted. In this way, a developer can promote an application using an advertisement or other type of content that is hosted outside an app store but links to a download page in the app store. Users may select a link, button, or other feature in the advertisement to start the process of downloading and installing the application. For example, selecting a link in the advertisement may display an app store download page that includes another link the user may select to download and install the application on their mobile device. When the user selects the link, the app store opens, thereby supplanting the application the user was using on the mobile device. However, users often do not follow through and download applications promoted in such advertisements. Users may not want to leave the application they are using, may be wary of online advertisements, or the process of opening the app store, reading about the application, and then downloading the application may be too slow or too much of an interruption for the user to follow through to completion.

In particular embodiments, a direct application install feature may be used by third-party applications to download and install other applications onto a mobile device. This direct install feature can be used to provide download links or buttons in third-party applications such as social-networking applications, web browsers, and the like. A user may perform a single action, such as touching the link or an associated button on a touch screen, to download and install an application. For example, content or an advertisement displayed on a web site or in another application many include a link that the user can select to download and install a downloadable application without leaving the host application in which the content or advertisement is presented. In particular embodiments, the direct install feature may be used by an application that presents content, such as advertisements, to download and install other applications directly, e.g., without requiring the user to interact with another application such as an app store. That is, an application can be downloaded and installed when a user selects an advertisement, without requiring the user to leave the application that displays the advertisement. This direct install feature may increase the number of users who download applications linked to by advertisements or other content, because users are more likely to download applications when the process is simple and non-intrusive.

In particular embodiments, the application to be downloaded may request permission to perform particular types of operations on the mobile device, such as accessing network or storage resources, in which case the user may be prompted to grant the requested permission in a dialog box or other user interface element. If the application to be downloaded does not request such permissions, or the user has previously granted the permissions, then the download and install may be performed in a single user interaction, e.g., with no further interactions by the user after the link has been selected. In particular embodiments, third-party applications such as those provided by third-party application developers are not permitted to download and install other applications, and such permission cannot be granted by the user. The direct install feature may, however, be implemented by delegating download requests from applications to particular computer program code that is authorized to download and install applications. The program code may have been authorized at the time of the device's manufacture, for example.

Figure 3:
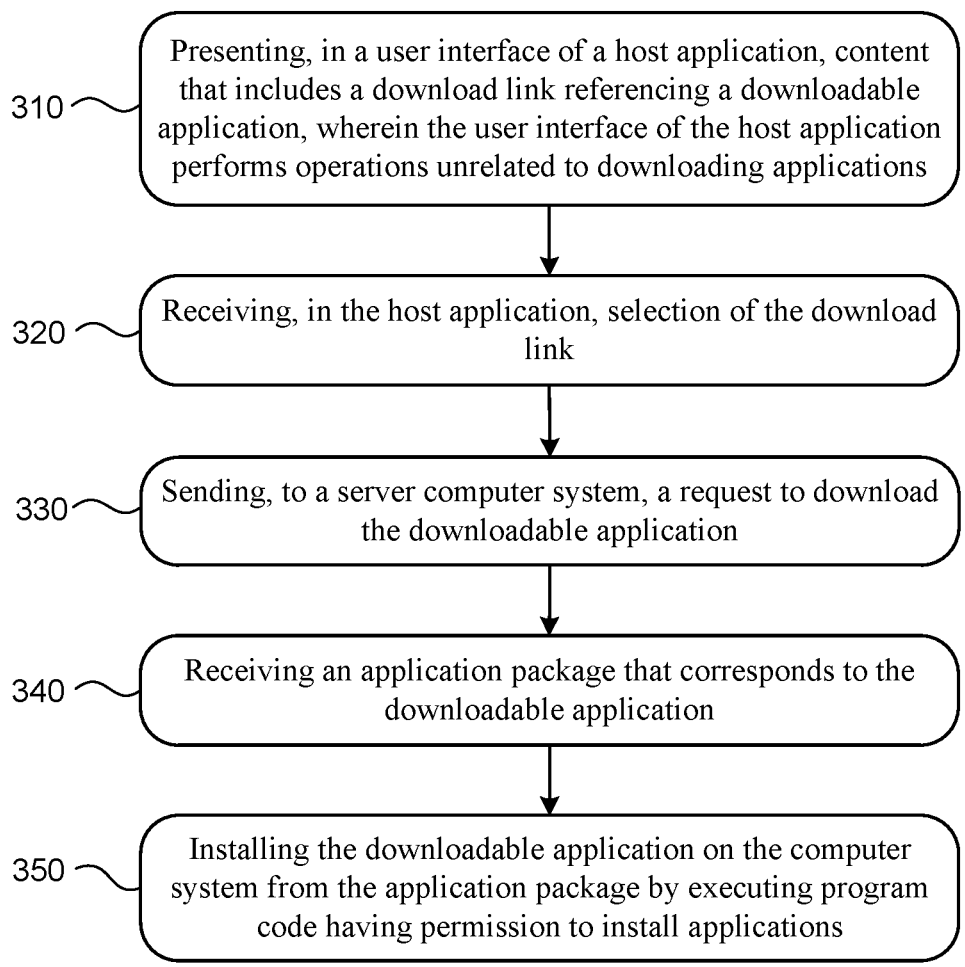
FIG. 3 illustrates an example method for downloading and installing applications.

FIG. 3 illustrates an example method 300 for downloading and installing applications. The method 300 may be executed by a computer system, such as the client system 130. The method 300 may begin at step 310, where the application installation system presents, in a user interface of a host application 132, content that may include a download link 166 referencing a downloadable application. A downloadable application may include data that can be received from a server 162 by a client system 130. The data may include a representation of computer program code that implements an application that, when installed on the client system 130, becomes an installed application 184, which can be executed to perform particular operations, e.g., a photo sharing application, a game, a text messaging application, and so on. The downloadable application may be an application package 172, e.g., an ANDROID application package ("APK") file, IPHONE application ("IPA") file, or the like. The link 166 may reference the application package 172 directly, or may reference another object on the server 162, such as HTML or JavaScript code that causes the application package 172 to be downloaded to the client system 130. Thus the downloadable application may be an object that references the application package 172. That is, the term downloadable application may refer to the application package 172 itself, or to another object that references the downloadable application and may be used to download the application package 172. Step 310 may be performed by, for example, the host application 132 on a client device 130. In particular embodiments, the host application is not an app store or other application primarily used for downloading applications, and the user interface of the host application 132 performs operations unrelated to downloading applications.

In particular embodiments, content 164, which may include one or more application download links 166 directly or indirectly referencing a downloadable application, can be displayed in a user's mobile feed in a host application 132. The content 164 may be, e.g., an advertisement for the downloadable application, or any other suitable type of online content such as text, graphics, or other media. The host application 132 may be, e.g., a social-networking application or a web browser executing on client device 130. Such content 164 may be displayed by other types of host applications as well. Previously, when a user selected a link 166 to the downloadable application, an app store would open in the user interface of the client device 130 and replace the host application in the user interface. Using the direct install features disclosed herein, however, the download and installation occur in the context of the host application 132 that displays the content 164, e.g., in the context of the social-networking application user interface. Consequently, in particular embodiments, an app store or other type of store-like interface is not needed to download applications. Instead of using an app store to distribute applications, a developer or other distributor of applications may include a link 166 to a downloadable application in ordinary content such as web pages or in other types of content displayed by the host application 132, and the link 166 may be selected to initiate the download process without the use of a store-like interface.

In particular embodiments, to perform the installation and download operations, the host application 132 may use an App Manager component 180 and an Installer component 182. The App Manager 180 may control portions of the application download and install process. In particular embodiments, the Installer 182 may perform the actual installation of the application package 172 using application install permissions that were granted when the mobile device was manufactured or configured by an entity having such permissions. The Installer may be restricted to performing a minimal set of operations, including the software installation operation (e.g., an install system call), to minimize the amount of code that has permission to install software on the device.

The App Manager 180 may perform at least a portion of one or more of the steps 310-350 of FIG. 3, and the Installer may perform at least the portion of step 350 that involves requesting the operating system of the client device 130 to install the application package on the client device 130. The App Manager 180 may download the application package 172 (e.g., Java APK package file) from the server 162, and instruct the Installer 182 to install the downloaded application package, manage application packages, and the like. The APK file may be provided by the server 162 of the social-networking system 160 and signed with a digital signature using a private key associated with the social-networking system 160 to show that the APK file was generated by the social-networking system 160. Alternatively, the APK file may be provided and signed by a third-party system 170. As another example, the APK may represent or contain a downloadable application that, when installed and subsequently executed, loads content from a bookmark address and presents the content to the user on the client device 130. The bookmark address may be a Uniform Resource Locator (URL) or other identifier that references the location of the content. The bookmark address may be provided by a third party, such as an application developer or other entity that provides the application package 172. In one example, the APK file may be generated automatically based on the bookmark address. Such an automatically-generated APK file may download and install an application that, when executed on a client device 130, loads content from the bookmark address (e.g., URL) and displays the content on the client device 130. Thus, for example, when a user selects a download link from an advertisement, and the download link is associated with a bookmark address, the automatically-generated APK is downloaded and installed.

The installed application may, when executed, load content from the URL and display the content, e.g., in a web view of a web browser or other application.

The App Manager 180 and/or Installer 182 may verify that the APK file has a valid signature to confirm that the APK file has not been modified since it was signed. The host application 132 may interact with the App Manager 180 to coordinate the download and installation operations with the host application user interface (e.g., a mobile feed interface in the social-networking host application example), and to get and display information about the state of the download and installation on the mobile device's screen. For example, the host application 132 may query the App Manager for the status of the download and installation, including the number of bytes received, and display the status.

In particular embodiments, the App Manager 180 may provide information about the applications that are installed on the client device 130, such as a list of applications that the App Manager has installed on the client device 130 and are presently on the device or are available to install on the client device (e.g., available for download). The host application 132 may retrieve the list of applications from the App Manager and display the list of installed apps when the user of the client device 130 starts a search in the host application. For example, when a search command is received, the list of installed apps may be displayed as search results, and when a search query is received, the installed apps that match the query may be displayed. For example, if an app named Messenger has been installed, the host application 132 may display the Messenger app as an icon labeled "Messenger" that the user may select to launch the Messenger app. The search may be a search of any type of appropriate object that matches the query, e.g, web pages, people, or applications, or may be a search command that specifically searches for applications.

In particular embodiments, the App Manager 180 and Installer 182 may be pre-loaded on devices, since the Installer 180 in particular is dependent on having permissions to install applications, and ordinary applications do not have these permissions. The App Manager 180 need not be pre-installed, but may be if desired. Pre-installing the App Manager 180 may be simpler to implement than installing it and configuring it (e.g., granting it permission to install applications) at a later time. Application developers may provide the social-networking system 160 with an installable application package 172 for their application, e.g., an ANDROID APK package file, to be distributed as part of an application advertisement or other content 164. The installable package 172 may be checked for security issues and posted on servers for download. When a download is requested or at other times, e.g., when the host application is opened, a check may be performed to determine whether the App Manager 180 and installer 182 are present and accessible on the client device 130. This check may be performed by the client device 130 and/or server 162. If the App Manager 180 and Installer 182 are not present, the ordinary app store for the operating system may be used as a fallback.

Step 320 may receive selection of the download link in the host application. For example, the user may touch or click on a hyperlink that has the text "Download Now" and is associated with a URL that references the application download page 168 or application package 172 on the server 162 (or on the third-party system 170). In particular embodiments, a customized news feed may display online advertisements, e.g., ad units or the like. The advertisements may be associated with downloadable applications, so that when the user of the client device 130 selects the advertisement, a download of the application associated with the advertisement may be initiated. For example, step 320 may receive selection of a download link displayed in or associated with a customized news feed in the host application. For example, when the user interacts with the advertisement, e.g., by clicking on or touching the advertisement, or by clicking on or touching a defined portion of the advertisement or a hyperlink in the advertisement, the download may proceed to step 330 below. The advertisement may be selected or customized based on the number of friends who have installed the application associated with the advertisement. For example, the particular advertisement that is displayed may be selected from a set of advertisements, each of which may be associated with a different application. The particular advertisement may be selected based on factors such as the number of friends who have installed the application associated with the advertisement. As another example, the advertisement may be customized based on the number of friends who have installed the application associated with the advertisement by including in the advertisement a count of the number of friends who have installed the associated application. The displayed advertisement may then indicate, for example, that five friends have installed this application. The number of friends may be the number of first-degree friends, or the number of friends having any degree of separation from the user.

In particular embodiments, conversion rates may be determined for an application. A conversion rate may be determined, for example, based on the number of times an advertisement is displayed or otherwise presented to any user (e.g., the number of impressions) and the number of times the advertisement leads to a request for installation or a successful installation by any user of the application associated with the advertisement. As an example, this conversion rate may be a ratio of the number of times the advertisement is displayed to the number of times the download link for the application associated with the advertisement is selected. As another example, the conversion rate may be a ratio of the number of times the advertisement is displayed to the number of times the application is successfully installed as a result of the user selecting the application's download link from the advertisement. The conversion rate may be for a particular user, e.g., the number of times the advertisement has been presented to a particular user divided by the number of times the application has been installed by that particular user. One or more of the conversion rates may be reported to an advertising campaign associated with the advertisement or with the developer of the application.

Step 330 may send, to the server 162, a request to download the downloadable application. The request may be, e.g., an HTTP or HTTPS request that identifies the application to be downloaded. The request may include other related information, such as the identity and credentials of the user requesting the download. Step 340 may receive an application package 172 that corresponds to, e.g., includes the program code of, the downloadable application. The application package may be stored in memory of the client device 130 or on a storage device such as non-a volatile memory or a disk.

Step 350 may install the downloadable application on the client device 130 from the application package 172 by executing program code having permission to install applications. In particular embodiments, the progress of the download and installation may be displayed, e.g., in the user interface of the host application 132. The user may continue to use the host application 132 while the application package 172 is being downloaded and installed, e.g., by scrolling through the mobile feed while the download and installation occur in the background. The host application 132 may remain in the foreground, e.g., interacting with the user, while the download and installation are performed. When the installation is complete, the user may be notified that the application has been installed and the user can open the application.

The application developer may include in the application package 172 a list of requested permissions 174 corresponding to particular operations or resources on the mobile device requested to be accessible to the application. The permissions may be, e.g., operating system permissions that provide access to features of the mobile device, such as the device's camera, photos, location, and so on. The host application 132 or the operating system of the client device 130 may perform a permission request that includes displaying the list of permissions required by the application, and requesting the user's approval to grant the permissions to the application. The user may decline one or more of the requested permissions 174. Different operating systems or different versions of an operating system, may have different ways of requesting the user's approval and granting the permissions, e.g., one operating system may request approval when the application is installed, while another operating system may request approval when the installed application 184 is executed. The permission request may be performed at any suitable point in the download and install operations prior to execution of the installed application 184. When a list of accepted permissions 176 has been received from the user, the host application 132 may send the accepted permissions 176 to the App Manager 179, which may compare the accepted permissions 176 to the requested permissions 174. If the lists do not match, then the application is not downloaded and installed. If the lists match, then the application download and install process may be initiated. If the requested permissions 174 are not requested or approved by the user prior to the download and installation, then a permission request may be displayed during the download or when the download is complete. If the requested permissions 174 have not been approved when the installed application 184 is opened, e.g., executed, then the permission request may be performed, e.g., by the operating system, the first time the installed application 184 is opened.

In particular embodiments, information from the social graph may be presented to the user as part of an application details display that may be shown prior to the user requesting download and installation of the application. This social graph information may be displayed in the content 164, or as information associated with the application. For example, the names of friends who have liked, installed, or interacted with the application may be shown, reviews written by friends may be highlighted or ranked highly (at the top of the list of reviews), and so on.

In particular embodiments, the download operation may be started in the background prior to receiving a download request from the user to pre-cache a portion of the application. Pre-caching may reduce the time needed to download the application if the user requests the download. The pre-caching may be performed based on the number of the user's friends or connections who are using or have used the application, and their interactions with the application. The size of the application package 172 may also be used as a factor to determine whether to pre-cache. A smaller application package (not shown), e.g., a mini-game or a demo of a larger application package may be provided by the developer to be installed on the client system 130 and used by the user while the larger application package 172 is downloading in the background. For example, an application developer may provide two APKs, including a demo APK and a complete APK. The demo APK may be smaller in size than the complete APK. While a user is interacting with the demo APK, the complete APK may be automatically downloaded by the client device 130, e.g., in the background. The smaller application package may be customized using social graph information before being sent to the client system 130. For example, an opponent in a game may be named after a friend of the user, with the name of the friend being extracted from the social graph. The customization may be performed before or after the application package 172 is sent from the server 162 to the client system 130. Other heuristics may be used to determine whether to pre-cache, such as the amount of free storage space on the client system 130, whether the user is more likely to install the application that corresponds to the application package 172 than other applications, and so on. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for downloading and installing applications including the particular steps of the method of FIG. 3, this disclosure contemplates any suitable method for downloading and installing applications including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
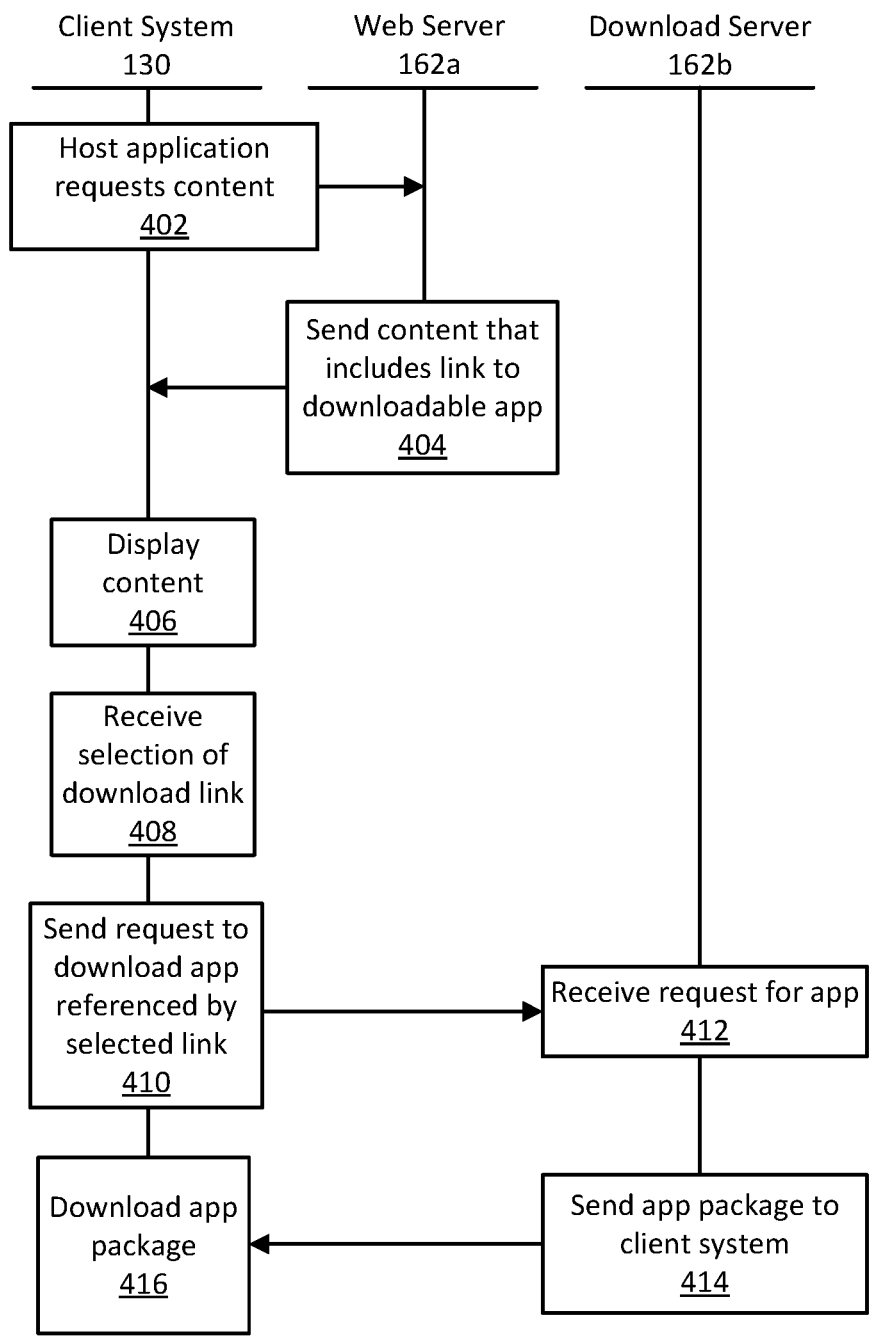
FIG. 4 illustrates an example interaction diagram for requesting and downloading applications.

FIG. 4 illustrates an example interaction diagram 400 for requesting and downloading applications. The interaction diagram starts at block 402, in which the host application, which may execute on the client system 130, requests identified content from the server 162, e.g., by sending a request message via the network 150. The request message may be an HTTP GET request or the like. The identified content may be a web page or other type of content, and many include a link to a downloadable application. The server 162 may be a web server, social-network server, or other suitable type of server.

At block 404, the server 162 may send the content, including the link, to the client system 130 via the network 150 in response to the request 402. At block 406, the client system 130 may present, e.g., display or otherwise communicate to the user, the content in the host application. At block 408, the client system 130 may receive selection of the download link 166. For example, selection may be received when the user presses or touches the download link 166 in the host application. At block 410, the client system 130 may send a request to download the application referenced by the selected download link. The request to download the application may be sent to the server 162, or to a separate download server, via the network 150, for example. At block 412, the server may receive the request to download the application. The download server may be separate from the social-networking server 162, or may be the social-networking server 162. At block 414, the server may send the application package to the client system 130 via the network 150. At block 416, the client system 130 may download the application package from the download server by receiving the package via the network 150.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for requesting and downloading applications including the particular steps of the method of FIG. 4, this disclosure contemplates any suitable method for requesting and downloading applications including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
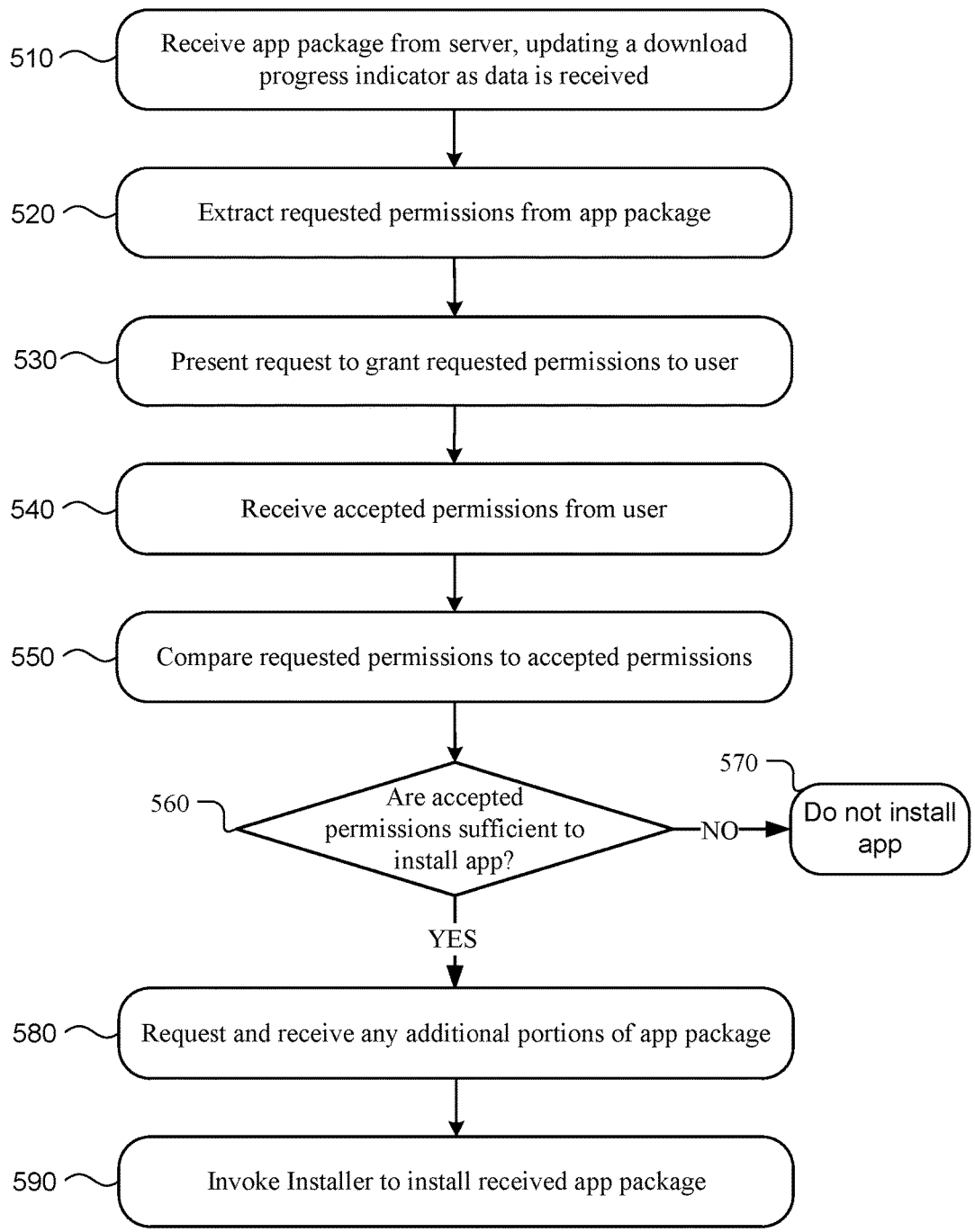
FIG. 5 illustrates an example method for receiving and installing applications.

FIG. 5 illustrates an example method for receiving and installing applications. The method 500 may be executed by a computer system, such as the client system 130. One or more steps of the method 500 may be performed by an App Manager 180 that executes on the client system 130. The method 500 may begin at step 510, where the client system 130 may receive the application package from the download server and update a download progress indicator, such as a progress bar in a user interface of the host application, to show information about the progress of the download, e.g., the percentage of data that has been received as the download progresses over time. Step 520 may extract the requested permissions from the application package. At step 530, a request to grant the requested permissions may be presented to the user. Depending on the operating system of the client system 130, a permissions dialog may be displayed to request that the user may approve permissions for access to particular hardware or software resources of the mobile device requested by the application developer (e.g., camera, network communication, and so on). This dialog may be displayed in the context of the application, e.g., in the newsfeed. The permissions dialog may be displayed at different points in the download process in different embodiments. For example, the permission dialog may be displayed after the application package has been downloaded from the server. In another embodiment, the requested permissions may be downloaded prior to downloading the application package, or may be extracted from the application package prior to completion of the download. In those cases, the permission dialog may be displayed when the set of requested permissions is received.

Step 540 may receive the accepted permissions from the user. Step 550 may compare the requested permissions to the accepted permissions. If step 560 determines that the accepted permissions are sufficient to install the application, then step 580 requests and receives any additional portions of the application package (e.g., if the application package has been partially downloaded), and at step 590 the App Manager may invoke the Installer to install the received application package 168. If step 560 determines that the permissions are insufficient, e.g., because the user has refused to grant one or more of the requested permissions 174, then the application package 168 is not installed, and the method 500 may end at step 570.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for receiving and installing applications including the particular steps of the method of FIG. 5, this disclosure contemplates any suitable method for receiving and installing applications including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
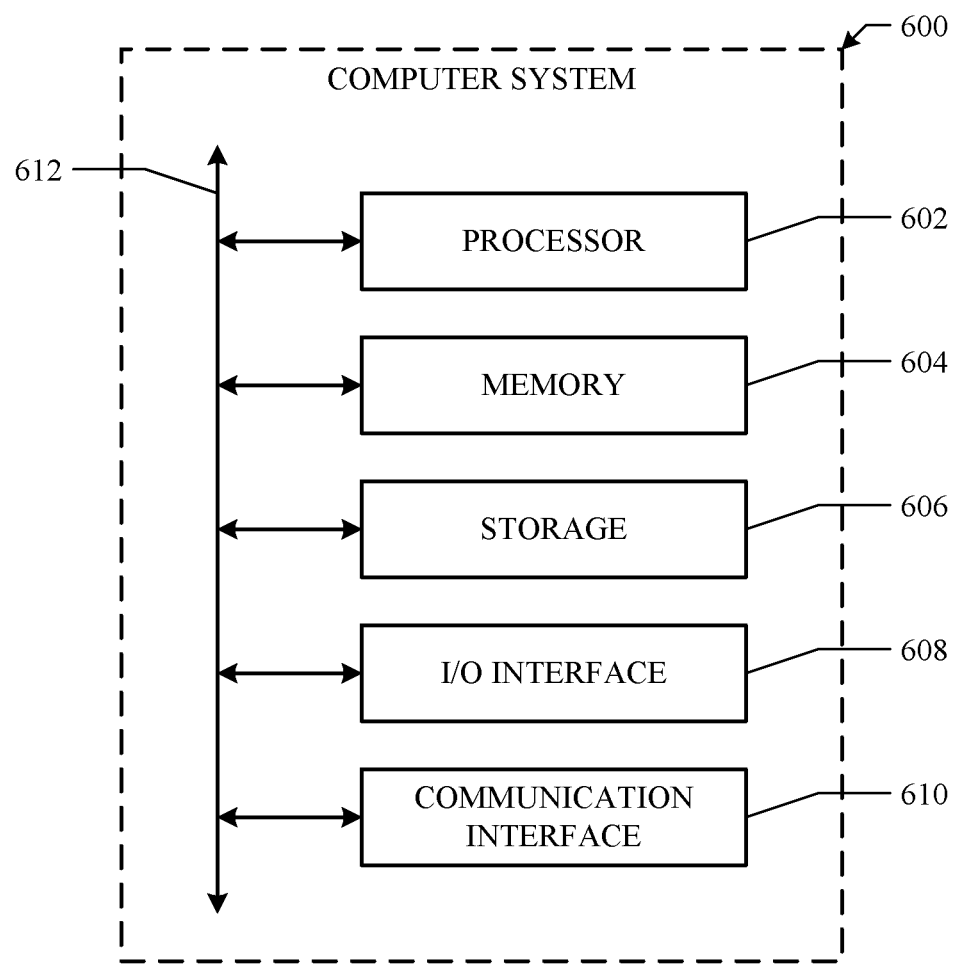
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:

by a client computer system, presenting, in a user interface of a host application, first content that includes a download link referencing an application package, wherein the user interface of the host application performs operations unrelated to downloading applications;

by the client computer system, receiving, in the host application, selection of the download link;

by the client computer system, downloading and installing the application package while the host application performs the operations unrelated to downloading applications, wherein the application package is associated with a bookmark address from which the application package has been automatically generated, and the downloading and installing comprises:

by the client computer system, sending, to a server computer system, a request to download the application package;

by the client computer system, receiving the application package, wherein the application package comprises a application;

by the client computer system, invoking an installer component to install the application package on the client computer system, thereby making the application available for use as an installed application, wherein the installer component performs a software installation operation by requesting an operating system of the client computer system to install the application package on the client computer system using application install permissions, and wherein the application install permissions have been granted to the installer component, and the installer component is restricted to performing the software installation operation, thereby minimizing the amount of program code in the installer component having permission to install applications on the client computer system; and by the client computer system, executing the installed application, wherein the executing the installed application comprises:

loading second content from the bookmark address; and displaying the second content on the client computer system.

2. The method of claim 1, wherein the content comprises an advertisement for the application received from the server computer system, and the advertisement comprises the download link.

3. The method of claim 1, wherein the download link identifies the server computer system and the application package.

4. The method of claim 1, wherein the downloading and installing further comprises displaying, in the user interface of the host application, an indication of progress of the downloading and installing.

5. The method of claim 1, wherein the downloading and installing are performed by application manager program code invoked by the host application.

6. The method of claim 5, wherein the application manager code invokes the program code having permission to install applications.

7. The method of claim 1, wherein the application package comprises a set of requested permissions, the requested permissions indicating operations to be performed on the client computer system.

8. The method of claim 7, further comprising presenting a request to perform the operations indicated by the set of permissions.

9. The method of claim 8, wherein the host application receives a set of accepted permissions.

10. The method of claim 9, wherein the installing is performed when the accepted permissions match the requested permissions.

11. A system comprising:

a client computer system; and a server computer system, wherein processors of the client and server computer systems execute instructions to:

present, in a user interface of a host application, content that includes a download link referencing an application package, wherein the user interface of the host application performs operations unrelated to downloading applications;

receive, in the host application, selection of the download link;

download and install the application package while the host application performs the operations unrelated to downloading applications, wherein the application package is associated with a bookmark address from which the application package has been automatically generated, and the downloading and installing comprises:

sending, to a server computer system, a request to download the application package;

receiving the application package, wherein the application package comprises a downloadable application;

invoking an installer component to install the application package on the client computer system, thereby making the downloadable application available for use as an installed application, wherein the installer component performs a software installation operation by requesting an operating system of the client computer system to install the application package on the client computer system using application install permissions, and wherein the application install permissions have been granted to the installer component, and the installer component is restricted to performing the software installation operation, thereby minimizing the amount of program code in the installer component having permission to install applications on the client computer system; and execute the installed application, wherein the executing the installed application comprises:

loading second content from the bookmark address; and displaying the second content on the client computer system.

12. The system of claim 11, wherein the content comprises an advertisement for the application received from the server computer system, and the advertisement comprises the download link.

13. The system of claim 11, wherein the download link identifies the server computer system and the application package.

14. The system of claim 11, wherein to download and install the host application, the processors of the client and server computer systems execute instructions to display, in the user interface of the host application, an indication of progress of the downloading and installing.

15. The system of claim 11, wherein the downloading and installing are performed by application manager program code invoked by the host application.

16. The system of claim 15, wherein the application manager code invokes the program code having permission to install applications.

17. The system of claim 11, wherein the application package comprises a set of requested permissions, the requested permissions indicating operations to be performed on the client computer system.

18. The system of claim 17, wherein the processors of the client and server computer systems execute instructions to present a request to perform the operations indicated by the set of permissions.

19. One or more computer-readable non-transitory storage media embodying software that is operable when executed to:

present, in a user interface of a host application on a client computer system, content that includes a download link referencing an application package, wherein the user interface of the host application performs operations unrelated to downloading applications;

receive, in the host application, selection of the download link;

download and install the application package while the host application performs the operations unrelated to downloading applications, wherein the application package is associated with a bookmark address from which the application package has been automatically generated, and the downloading and installing comprises:

sending, to a server computer system, a request to download the application package;

receiving the application package, wherein the application package comprises a downloadable application;

invoking an installer component to install the application package on the client computer system, thereby making the downloadable application available for use as an installed application, wherein the installer component performs a software installation operation by requesting an operating system of the client computer system to install the application package on the client computer system using application install permissions, and wherein the application install permissions have been granted to the installer component, and the installer component is restricted to performing the software installation operation, thereby minimizing the amount of program code in the installer component having permission to install applications on the client computer system; and execute the installed application, wherein the executing the installed application comprises:

loading second content from the bookmark address; and displaying the second content on the client computer system.

20. The media of claim 19, wherein the download link identifies the server computer system and the application package.

* * * * *